Figure 1:
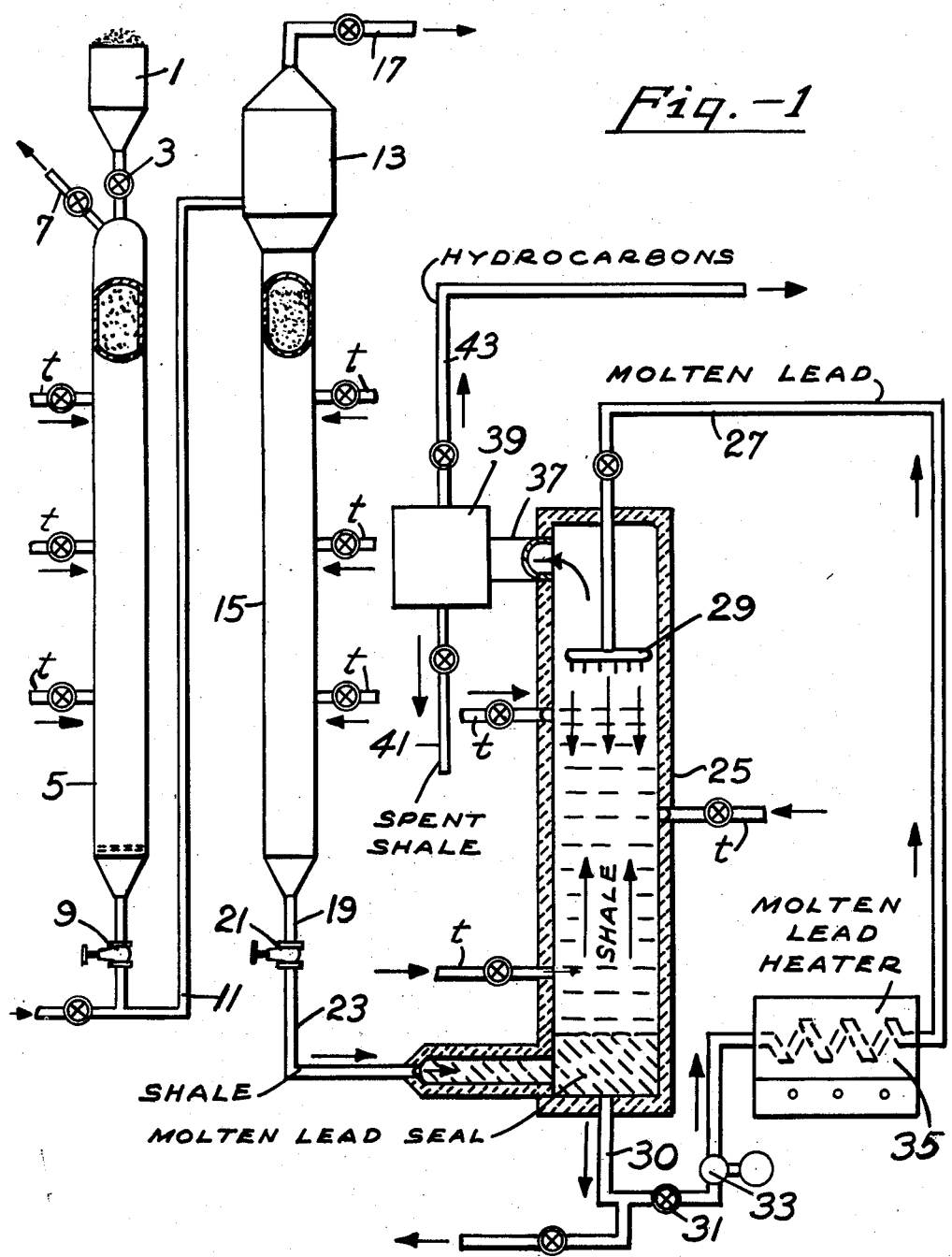

United States Patent Office 2,700,018
Patented Jan. 18, 1955

2,700,018
FLUIDIZED DISTILLATION OF OIL SHALE BY DIRECT HEATING WITH A HEATED LIQUID SPRAY

George R. Gilbert, Elizabeth, N. J., assignor to Standard Oil Development Company, a corporation of Delaware Application December 20, 1949, Serial No. 134,049

5 Claims. (Cl. 202—16)

The present invention relates to improvements in the distillation or retorting of carbonizable solids. More specifically, the present invention relates to a novel process and apparatus which may be applied with particular advantage to the distillation or retorting of oil shale, coals, lignite, cellulosic materials or the like, and wherein the heat required for retorting is transferred to the solids to be retorted, from a liquid heat transfer medium having a higher specific gravity than the shale and flowing in direct heat exchange with, and countercurrently to, the solids through the distillation zone.

Heretofore, carbonizable materials of the type mentioned above have been distilled in fixed or moving bed operations involving various disadvantages such as discontinuity of operation, poor temperature control and heat distribution, insufficient heat transfer to the solids being distilled, etc. Most of these difficulties have been overcome more recently by the development of the so-called fluid solids technique and its adaptation to carbonaceous solids handling. This technique, in which the reactions take place in a dense fluidized bed of finely divided solids maintained in a turbulent ebullient state by means of upwardly flowing gases, affords greatly improved rates of heat transfer and distribution of heat throughout the conversion zone, effective and uniform contacting of solid and gas, and ease of solids handling.

The fluid solids technique is especially suited to the distillation of carbonaceous solids wherein the heat required for the distillation is generated by a combustion of combustible solids undergoing distillation, since the active agitation and intermixing of particles in the turbulent fluidized bed results in a neutralization throughout the distillation zone of the exothermic heat developed in the combustion reaction, by the cooling which results from the endothermic distillation reaction. Heat-consuming production reactions and heat-generating combustion reactions may be carried out, if desired, in separate fluid-type reactors involving the transfer of heat in the form of sensible heat of fluidized solids circulating from the heat-generating to the heat-consuming zones so that dilution of combustible product vapors and gases with flue gases is avoided and air may be used as the combustion-supporting gas without nitrogen dilution of the product.

However, in the latter type of operation it has been observed that substantial product losses are caused by an excessive build-up of carbon in the distillation zone and the subsequent combustion of said carbon in the combustion zone. Another problem arises as the result of a strong tendency of the shale to disintegrate rapidly in the course of the pyrolytic treatment to particles having an extremely small size of about 0–20 microns which is the unit particle size of the shale silt. For example, Colorado shale when subjected to a fluid-type distillation quickly forms a mass containing about 70% of fines of 0–20 microns size and this even if the shale is charged in rather coarse aggregates. At the conditions of fluid shale distillation, these fines are fully entrained by the fluidizing gases and rapidly carried overhead from the fluidized beds in the distillation and combustion zones, complicating liquid product recovery due to slurry formation and detrimentally affecting the fluidity of the fluidized beds. The entrainment rate of these shale fines is not only a function of their particle size but, in addition, increases as the carbon concentration of the fines increases.

The present invention overcomes the aforementioned difficulties and affords various additional advantages. These advantages, the nature of the invention and the manner in which it is carried out will be fully understood from the following description thereof read with reference to the accompanying drawing which shows semi-diagrammatic views of a system adapted to carry out preferred embodiments of the invention.

In accordance with the present invention, subdivided oil-bearing minerals, such as oil shale, are intimately contacted in countercurrent flow with a liquid heating medium preheated at least to the desired distillation temperature and having a specific gravity sufficiently different from that of the solids undergoing distillation to permit separation of solids and heating medium by gravity. Heating media suitable for the purposes of the invention are such as will remain in the liquid state throughout the distillation process, i. e. liquids which have freezing points substantially below the lowest temperature and boiling temperatures substantially above the highest temperature occurring in the distillation zone. The liquids should also be essentially inert, i. e. they should not detrimentally affect the yield and quality of the desired distillation products.

In accordance with the preferred embodiment of the invention, oil shale crushed to a particle size of about 50 mesh to ½ in. is charged to the lower portion of a vertical distillation retort and forced upwardly through the retort in countercurrent flow to a liquid heating medium having a specific gravity substantially greater than that of the shale and preheated to a temperature substantially above the minimum distillation temperature of, say, about 700° F. The preferred heating medium for this embodiment of the invention is molten lead which has a freezing point of about 620° F. and a boiling point of 2935° F. Other suitable liquids are molten alloys of lead and tin, bismuth and tin, Wood's metal, etc. having suitable freezing and boiling points, such as freezing below about 600° F. and boiling above about 1600° F., or suitable salts or salt mixtures, such as NaCl and KCl, sodium and potassium silicates, glasses, etc. The feed rates and feed temperatures of the heating liquid and shale and the residence and contact times of shale and heating liquid within the retort should be so controlled that the shale leaves the top of the retort substantially completely denuded of distillable constituents and the heating medium leaves the bottom portion of the retort at a temperature substantially above its freezing point.

For example, these conditions may be readily so controlled that the shale rising through the retort is heated to at least optimum distillation temperatures of, say, about 800°–950° F. and maintained at these optimum temperatures for, say, about 0.2–2 minutes. For this purpose, molten lead may be fed to the top of the retort at a temperature of about 900°–1050° F. and a rate of about 2–20 lbs. per lb. of fresh shale fed at atmospheric temperature and at total shale residence times within the retort of about 0.1–20 minutes. If desired, the feed temperatures of the lead may be raised substantially above 1050° F., say to about 1600°–2000° F., so as to accomplish a substantial cracking of the volatile distillation products.

The liquid heating medium, such as molten lead, may be allowed to accumulate within the distillation retort and to assume any desired level therein. The subdivided shale charged rises through the body of liquid metal, compelled by the combined forces of buoyancy and feed pressure. The spent shale may either be discharged immediately above the liquid level or allowed to form thereabove a relatively dense bed of solids which rises through the upper portion of the retort countercurrently through the molten lead supplied preferably via suitable distributing means, to the top of the retort. Intimate contact and heat transfer between heating liquid and solids is accomplished below and above the liquid level as a result of the relatively high turbulence caused by the distillation vapors liberated in the retort. Simultaneously, the turbulence so created prevents excessive adherence of heating liquid to the shale particles removed from the retort. If desired, these effects may be enhanced by supplying an extraneous fluidizing gas, such as product tail gas or the like, to a lower portion of the retort and/or by providing suitable baffles describing a tortuous path for liquid and solids within the retort. Product vapors may be withdrawn from an upper portion of the retort together with or separate from the spent shale and passed through suitable gas-solids separation means to conventional refining facilities.

The used heating liquid may be withdrawn separately from the oil shale and reheated to its desired feed temperature in any suitable manner. Combustion of spent shale may be used to generate the heat required for this purpose. For example, the used heating liquid may be passed through heating coils heated by the hot flue gases of spent shale combustion or arranged in a combustion zone wherein spent shale is burned. In accordance with a preferred embodiment of the invention, spent shale is suspended in a combustion-supporting gas, such as air, burned in a separate burner and the suspension of shale ash in flue gas is passed through the used heating liquid for reheating. Circulation of the heating liquid from the bottom of the retort through ther reheating equipment to the top of the retort may be accomplished by suitable pumps, by gas lift, or by injector means operated with a suitably compressed product gas in a manner obvious to those skilled in the art. The subdivided shale may be supplied by means of conventional ram feeders, single or multiple aerated standpipes or by means of lockhoppers to the lower portion of the retort against the back pressure of the retort charge. When single or multiple standpipes, for example of the type described in U. S. 2,311,564, are used the feed pressure generated by such standpipes may be increased by the addition of metals, such as iron, lead, etc., to the solids in the standpipes, or by forcing the shale mechanically downwardly through a vertical column of a high density liquid, such as mercury, which serves simultaneously the build-up of pressure and as a seal between the atmosphere and the retort. Systems of this type are described in detail in the copending application Serial No. 123,070 filed October 22, 1949 and assigned to the assignee of the present application.

Instead of using a heating liquid having a specific gravity substantially greater than that of the shale, specifically lighter heating liquids, such as aluminum, lithium, magnesium, potassium, sodium, and their mixtures or alloys, may be employed. In this case, the shale may be fed to the top and the heating liquid to the bottom of the retort, reversing the flow described above. However, this procedure involves considerable difficulties such as those arising in connection with a shale withdrawal from the bottom of the retort without an undesirable loss of liquid heating medium. The use of a heating liquid having a specific gravity greater than that of the shale in combination with the flow of liquid and solids described above is, therefore, preferred.

Figure 2:
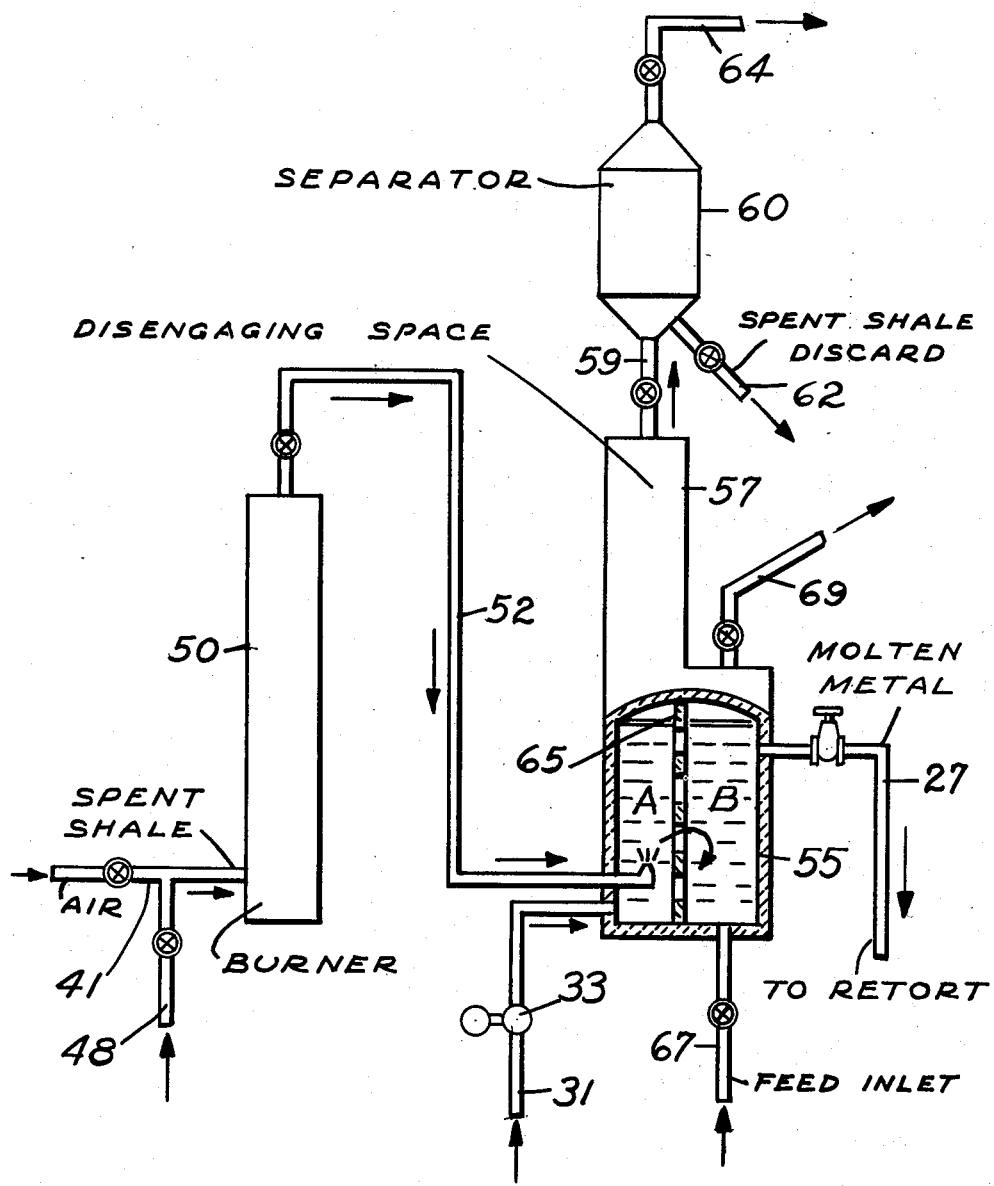

Having set forth its objects and general nature, the invention will be best understood from the more specific description hereinafter wherein reference will be made to the accompanying drawing in which:

Figure 1 illustrates semi-diagrammatically a retorting system adapted to carry out the invention; and Figure 2 is a similar illustration of a heat-generation and transfer system adapted to cooperate with the system of Figure 1.

Referring now in detail to Figure 1, the system illustrated therein essentially comprises a substantially vertical shaft-like distillation retort 25 and a multiple standpipe arrangement 5, 15 for charging fresh carbonizable solids to retort 25. The operation of this system will be described below using the distillation of oil shale by means of preheated molten lead as an example. It should be understood, however, that the system may be used in a generally analogous manner to carbonize other carbonizable solids and that other heating liquids may be employed.

In operation, raw oil shale which may be crushed to a particle size passing a ½ in. screen is charged from a hopper 1 by means of a star feeder 3 or the like to the top of standpipe 5 which may be aerated with small amounts of product tail gas, flue gas, or the like, supplied through taps $t$ at a superficial linear velocity of about 0.1–0.5 ft. per second to maintain the shale in standpipe 5 in the form of a dense vibrating freely flowing mass having an apparent density of about 30–80 lbs. per cu. ft. and exerting a pseudo-hydrostatic pressure on its base. Any fluidizing gas rising upwardly through standpipe 5 may be vented through line 7. The shale passing down standpipe 5 is fed through any suitable valve 9 into line 11 through which a carrier gas flows under a pressure approximating the pseudo-hydrostatic pressure on the base of standpipe 5. The amount of carrier gas introduced into line 11 should be sufficient considerably to reduce the apparent density of the shale suspension to, say, about 5 lbs. per cu. ft. or less. Superficial gas velocities in excess of, say, about 30 ft. per second are suitable for this purpose and to carry the suspended shale to the top of standpipe 15 via a gas-solids separator 13. Carrier gas may be vented through line 17. The shale separated in separator 13 drops into standpipe 15 to form therein a freely flowing mass aerated through taps $t$, in a manner similar to that explained in connection with standpipe 5.

The shale in the bottom of standpipe 15 may be withdrawn through line 19 provided with a suitable control valve 21 and passed through line 23 into the bottom of retort 25 under the combined pseudo-hydrostatic pressures of standpipes 5 and 15. The height of standpipes 5 and 15 depends on the back pressure to be overcome by the shale to be charged to retort 25 and on the desired retorting pressure. Pressures as high as about 50–200 lbs. per sq. in. may be readily built up in two standpipes of the type described having a combined length of about 100–400 ft. If higher pressures are required in the retort, for example 600 lbs. per sq. in., the height and/or number of the standpipes may be increased correspondingly.

Returning now to retort 25, molten lead having a temperature of about 900°–1050° F. is supplied from line 27 to the top of the retort preferably via a spraying nozzle or other distributing means 29 to be evenly distributed over the entire cross-sectional area of retort 25 which is advantageously well heat-insulated to prevent excessive heat losses. The molten lead passes down through retort 25 countercurrently to the upwardly moving shale fed through line 23 and is withdrawn at a temperature of about 650°–800° F. from the bottom of retort 25 through line 30 provided with a control valve 31. The withdrawn lead may be circulated by pump 33 through suitable heating means schematically indicated at 35 and returned through line 27 to the top of retort 25. The circulation rate of the molten lead is preferably so controlled that sufficient molten lead collects in the bottom of retort 25 to form a liquid seal preventing the escape of vapors through line 30, as indicated in the drawing. However, the molten lead level may also be allowed to rise to any higher elevation provided the pressure exerted by the liquid lead column does not exceed such pressures as may be readily built up by the shale feeding means used.

The shale entering retort 25 through line 23 rises upwardly through the retort and floats above the lead seal in the form of a relatively dense solids mass agitated by the distillation vapors liberated to assume apparent densities of about 10–60 lbs. per cu. ft. above the molten lead level. In the lower and intermediate retort sections, the shale is quickly preheated from its feed temperature to optimum distillation temperature at which it may be kept in the upper sections of the retort until distillation is substantially complete. Spent shale and distillation vapors may be withdrawn together from the top of retort 25 through line 37 and passed to a gas-solids separator 39. Spent shale recovered from separator 39 through line 41 may be either subjected to higher temperatures in a second retort (not shown) similar to retort 25, or returned to hopper 1 for recycling or burned to generate the heat required by the process, for example in the manner described below with reference to Figure 2.

The distillation products leaving separator 39 through line 43 may be passed to any conventional product recovery system (not shown). If desired, all or part of the hot distillation product may be used to preheat the shale, for example in hopper 1 and/or standpipes 5 and 15. In this case, part of the distillation vapors may be introduced through taps $t$ to aerate and simultaneously preheat the shale columns.

When operating in the general manner described above, the following conditions should be maintained in retort 25.

| | Broad Range | Narrow Range |
|---|---|---|
| Shale Inlet Temperature, ° F | 600–800 | 650–700 |
| Shale Outlet Temperature, ° F | 850–1,050 | 900–1,000 |
| Feed Ratio, Lbs. of Lead/Lb. of Shale | 1–20 | 5–10 |
| Lead Inlet Temperature, ° F | 900–1,200 | 950–1,100 |
| Residence Time of Shale, minutes | 0.1–20 | 5–10 |

If it is desired to cause substantial cracking of heavy distillation products within retort 25, the inlet temperature of the molten lead may be raised to about 1600°–2000° F., preferably 1100°–1800° F. The cracking effect may be further enhanced by the addition of small amounts of a conventional cracking catalyst, such as various natural or synthetic clays, suitable composites of silica, alumina and/or magnesia, etc.

Referring now to Figure 2 of the drawing, the system shown therein illustrates a molten lead reheating system which may take the place of heating equipment 35 of Figure 1. Like apparatus elements of Figures 1 and 2 are identified by like reference characters.

In operation, spent shale withdrawn through line 41 may be suspended in air supplied through line 48 and passed to a combustion zone or burner 50 wherein the shale coke is burned at a temperature above about 1200° F. If desired, a fuel such as recycle gas, oil, etc., may also be burned in burner 50 to supply additional heat. Hot flue gases carrying entrained burned shale are withdrawn from burner 50 through line 52 and passed substantially at the temperature of burner 50 to a lower portion of a heat-insulated molten lead heater 55. Molten lead withdrawn from retort 25 through line 31 is pumped by pump 33 to heater 55 which is preferably arranged at a level above the top of retort 25. Molten lead withdrawal line 27 carries reheated lead to the top of retort 25, preferably by gravity. Supply and withdrawal rates of molten lead to and from heater 55 are so controlled that a molten lead column of substantial height is allowed to build up within heater 55.

The hot suspension of burned shale in flue gases passes upwardly through the lead bath in heater 55 so as to reheat the molten lead to a temperature above about 900° F. as desired. The contact times between the hot suspension and the lead bath may be extended by suitable baffling of heater 55 or similar means obvious to those skilled in the art. The spent shale, as a result of its lower specific gravity, is carried to the surface of the lead bath and is entrained therefrom in the flue gas leaving the lead bath. This reentrainment of the shale in the flue gas above the lead bath is facilitated by the fact that the shale breaks down to a relatively small particle size of, say, about 200–400 mesh in the course of the distillation and subsequent combustion, as a result of the removal of its kerogen content which acts as a binder for the small clay particles of the shale.

The suspension of burned shale in flue gases withdrawn from the top of the lead bath in heater 55 may be passed through a disengaging space 57 wherein entrained lead droplets are permitted to settle out. The suspension then enters, through line 59, a conventional gas-solids separator 60. Spent shale may be discarded through line 62 and flue gases may be vented through line 64, both, if desired, after suitable further heat recovery.

In many cases, the heat which may be recovered by a combustion of the retorted shale is substantially in excess of that required to maintain the heat balance of the system. In this case, heater 55 may be used to preheat process materials, particularly feed gases, for other processes. For example, heater 55 may be separated into two sections A and B by a vertical perforated plate, baffle or other suitable device 65. The molten metal may flow through the perforations but gases on one side of baffle 65 do not mix with gases on the other side. While the hot suspension of burned shale in flue gases passes through section A, another gas, such as natural gas or any other gaseous hydrocarbon to be used in the production of hydrocarbon synthesis feed gas, hydrogen, or water gas, may be supplied to section B through line 67 and withdrawn through line 69 substantially at the temperature of the lead bath in heater 55.

The operations described with reference to the drawing may be modified in various ways. It has been indicated above, that other solids and liquid feeding means, other heating liquids, other carbonaceous materials, and other heating means than those specifically illustrated may be used. In addition, it may be noted that the invention is readily applicable to the drying of solids, for example to the drying of clays or catalysts, in a generally analogous manner.

With reference to the standpipe modifications mentioned, it is noted that when iron balls or particles are added to the standpipes to reduce their required height, magnetic means may be provided for separating the iron particles from the carbonizable solids prior to their entry into retort 25. For this purpose, the lower portion of the feed standpipe may be divided by a vertical baffle into two sections and a magnetic field may be applied to one section so as to force all magnetic solids into this section from which they may be withdrawn separately and returned to the top of the standpipe as will be readily understood by those skilled in the art to whom may occur many other modifications within the spirit of the invention.

The foregoing description and exemplary operations have served to illustrate specific modifications of the invention but are not intended to be limiting in scope.

What is claimed is:

1. In a process for producing oil from oil shale in a vertically elongated distillation zone maintained at an elevated distillation temperature, the improvement which comprises heating a liquid heating medium substantially above said distillation temperature in a heating zone external with respect to said distillation zone, said heating medium having a specific gravity substantially greater than said shale, circulating said heated heating medium to the top of said distillation zone, passing said heating medium downwardly as a falling spray evenly distributed over the cross-sectional area of said distillation zone, collecting a pool of liquid heating medium at the bottom of said distillation zone to form a liquid seal preventing the escape of vapors, introducing subdivided shale feed into the bottom portion of said distillation zone for upward passage therethrough, passing gas upwardly through said distillation zone to maintain said shale in the form of a dense fluidized mass above the said pool of liquid heating medium, maintaining said fluidized mass of shale in direct contact with the aforesaid falling spray of liquid heating medium and thereby supplying substantially all heat required for the shale distillation as sensible heat of said heating medium, withdrawing spent shale in the form of a gasiform suspension comprising liberated hydrocarbon vapors from the top of said distillation zone, and withdrawing liquid heating medium from said pool in the bottom portion of said distillation zone for recirculation to said heating zone.

2. A process according to claim 1 wherein said liquid heating medium is molten lead.

3. A process according to claim 2 wherein said lead is heated by heat generated by the combustion of spent coke-containing shale.

4. In a process for producing oil from oil shale in a vertically elongated distillation zone maintained at an elevated distillation temperature, the improvement which comprises introducing molten lead at a temperature of about 900 to 1050° F. and substantially above said distillation temperature into the top of said distillation zone and passing it downwardly therethrough as a falling spray evenly distributed across the cross-sectional area thereof, collecting a pool of said molten lead at the bottom of said distillation zone to form a liquid seal preventing the escape of vapors, introducing subdivided shale feed to the top of an elongated column wherein said shale is maintained as a dense aerated mass exerting a substantial pseudo-hydrostatic pressure on its base, withdrawing shale from the bottom of said column at the said pseudo-hydrostatic pressure, mixing said withdrawn shale under pressure with a carrier gas compressed to a similar pressure, passing the resulting suspension of shale and gas under pressure to the top of another elongated column, separating said gas from said shale under pressure, passing said shale downwardly through said second column as a dense aerated mass whereby the pseudo-hydrostatic pressure at the base of said second column is substantially increased with respect to said pseudo-hydrostatic pressure at the base of said first column and is sufficient to overcome the back pressure of the distillation zone, withdrawing said shale at the base of said second column at said increased pressure, introducing said shale at said increased pressure upwardly through said pool at the bottom of said distillation zone at a rate corresponding to about 1 lb. of shale per 5 to 10 lbs. of molten lead introduced at the top of said distillation zone, said molten lead feed being sufficient to maintain said distillation zone at about 800 to 950° F. and to supply substantially all heat required for the shale distillation as sensible heat of the molten lead, passing an extraneous fluidizing gas upwardly through said distillation zone to maintain said shale in the form of a dense fluidized mass having an apparent density of about 10 to 60 lbs./cu. ft. above said pool of molten lead, said fluidized mass being in direct contact with the aforesaid spray of molten lead, withdrawing coke-containing spent shale and liberated hydrocarbon vapors in the form of a gasiform suspension from the top of said distillation zone, separating said liberated hydrocarbon vapors from said spent shale, pumping said molten lead substantially at distillation temperature from said pool at the bottom of said distillation zone to a heating zone wherein said molten lead is maintained as column of substantial height, said heating zone comprising two separate gas impervious compartments side by side above said lead column, suspending the aforesaid separated coke-containing shale in air, passing the suspended shale to a combustion zone where the shale coke is burned at a temperature above about 1200° F., passing hot flue gases carrying entrained burned shale substantially at combustion temperature upwardly through said lead column at one side of said heating zone to heat said lead column to the required temperature for recirculation to said distillation zone, withdrawing flue gases from one of said compartments of said heating zone, and passing natural gas upwardly through said lead column at said other side of said heating zone to use any excess heat of combustion for preheating said natural gas, and withdrawing said preheated gas from said other compartment.

5. A process according to claim 4 wherein the separated hot hydrocarbon vapors from the distillation zone are introduced at spaced points along the height of said elongated shale feed columns to aerate and preheat the same.

References Cited in the file of this patent

UNITED STATES PATENTS

| | | |
|---|---|---|
| 1,124,482 | Luckenbach | Jan. 12, 1915 |
| 1,172,682 | Doherty | Feb. 22, 1916 |
| 1,601,777 | Spotz | Oct. 5, 1926 |
| 1,734,970 | Jenson | Nov. 12, 1929 |
| 1,859,292 | Egloff et al. | May 24, 1932 |
| 1,896,986 | Tillmann | Feb. 7, 1933 |
| 1,905,185 | Morris | Apr. 25, 1933 |
| 1,926,563 | Seifer | Sept. 12, 1933 |
| 2,015,085 | Oberle | Sept. 24, 1935 |
| 2,051,354 | Thomas | Aug. 18, 1936 |
| 2,055,313 | Ruthruff | Sept. 22, 1936 |
| 2,074,529 | Arveson | Mar. 23, 1937 |
| 2,303,785 | Ballou | Dec. 1, 1942 |
| 2,334,583 | Reeves | Nov. 16, 1943 |

FOREIGN PATENTS

| | | |
|---|---|---|
| 858,158 | France | July 21, 1939 |